US010223525B2

(12) United States Patent
Lee

(10) Patent No.: US 10,223,525 B2
(45) Date of Patent: *Mar. 5, 2019

(54) DISPLAY APPARATUS AND METHOD FOR CONTROLLING DISPLAY APPARATUS THEREOF

(71) Applicant: SAMSUNG ELECTRONICS CO., LTD., Suwon-si (KR)

(72) Inventor: Dae-bong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,917

(22) Filed: Apr. 2, 2018

(65) Prior Publication Data

US 2018/0225445 A1   Aug. 9, 2018

Related U.S. Application Data

(63) Continuation of application No. 14/628,748, filed on Feb. 23, 2015, now Pat. No. 9,965,617.

(30) Foreign Application Priority Data

Mar. 5, 2014   (KR) .......................... 10-2014-0025964

(51) Int. Cl.
*H04N 21/44*   (2011.01)
*G06F 21/51*   (2013.01)
(Continued)

(52) U.S. Cl.
CPC ............ *G06F 21/51* (2013.01); *G06F 3/0484* (2013.01); *G06F 21/10* (2013.01); *G09G 5/00* (2013.01);
(Continued)

(58) Field of Classification Search
CPC ........... G09G 2358/00; H04N 21/2353; H04N 21/4432; H04N 21/84; H04N 21/4755;
(Continued)

(56) References Cited

U.S. PATENT DOCUMENTS 6,020,882 A * 2/2000 Kinghorn ............... H04H 60/16
                                                         348/E5.099
6,163,316 A * 12/2000 Killian ............... H04N 5/44543
                                                         348/553
(Continued)

FOREIGN PATENT DOCUMENTS

EP   2293562 A2   3/2011

OTHER PUBLICATIONS

Communication dated Jul. 24, 2015, issued by the European Patent Office in counterpart European Application No. 15155129.8.
(Continued)

*Primary Examiner* — Nelson Giddins
(74) *Attorney, Agent, or Firm* — Sughrue Mion, PLLC

(57) ABSTRACT

A display apparatus which determines a screen to be displayed when a power-on command is input, and method thereof, is provided. The display apparatus includes a display configured to display a content; an input unit configured to receive a command; and a controller configured to: in response to a power-off command being input while a content is displayed, determine whether or not the displayed content is appropriate to be subsequently displayed when a power-on command is input; in response to determining that the displayed content is not appropriate to be subsequently displayed when the power-on command is input, store a predetermined initial screen; in response to determining that the displayed content is appropriate to be subsequently displayed when a power-on command is input, store the displayed content; and in response to a power-on command
(Continued)

being input, control the display to display the predetermined initial screen or the displayed content.

10 Claims, 8 Drawing Sheets

(51) Int. Cl.
    *G09G 5/00*     (2006.01)
    *G06F 3/0484*     (2013.01)
    *G06F 21/10*     (2013.01)
    *H04N 21/235*     (2011.01)
    *H04N 21/278*     (2011.01)
    *H04N 21/433*     (2011.01)
    *H04N 21/475*     (2011.01)
    *H04N 21/84*     (2011.01)

(52) U.S. Cl.
    CPC ....... *H04N 21/2353* (2013.01); *H04N 21/278* (2013.01); *H04N 21/4331* (2013.01); *H04N 21/44008* (2013.01); *H04N 21/4751* (2013.01); *H04N 21/84* (2013.01); *G09G 2330/026* (2013.01); *G09G 2330/027* (2013.01); *G09G 2360/16* (2013.01)

(58) Field of Classification Search
    CPC ........... H04N 21/4751; H04N 21/4532; H04N 21/4661; H04N 21/44008; G06F 21/81; G06F 9/4418; G06F 9/442; G06F 11/2284; Y02B 60/1242
    See application file for complete search history.

(56) References Cited

U.S. PATENT DOCUMENTS

| | | | | |
|---|---|---|---|---|
| 9,268,941 | B1* | 2/2016 | Akdemir | G06F 9/4418 |
| 9,508,278 | B2* | 11/2016 | Jain | G09G 3/20 |
| 2008/0158434 | A1* | 7/2008 | Jung | G06F 9/4403 |
| | | | | 348/730 |
| 2008/0216122 | A1* | 9/2008 | Pong | H04N 5/44543 |
| | | | | 725/46 |
| 2009/0055189 | A1* | 2/2009 | Stuart | H04H 20/106 |
| | | | | 704/270 |
| 2009/0059103 | A1* | 3/2009 | Azor | G02F 1/1347 |
| | | | | 349/8 |
| 2009/0231252 | A1* | 9/2009 | Maegawa | G06F 21/84 |
| | | | | 345/87 |
| 2010/0033491 | A1* | 2/2010 | Sugamata | G09G 3/344 |
| | | | | 345/530 |
| 2010/0045868 | A1* | 2/2010 | Kim | H04N 5/44591 |
| | | | | 348/569 |
| 2010/0070773 | A1* | 3/2010 | Tanaka | H04N 21/4331 |
| | | | | 713/176 |
| 2010/0107185 | A1* | 4/2010 | Shintani | H04N 21/4126 |
| | | | | 725/25 |
| 2010/0141685 | A1* | 6/2010 | Lee | G09G 5/395 |
| | | | | 345/667 |
| 2010/0271378 | A1* | 10/2010 | Low | G09G 3/344 |
| | | | | 345/531 |
| 2011/0046755 | A1* | 2/2011 | Sung | H04N 21/43615 |
| | | | | 700/90 |
| 2011/0058237 | A1* | 3/2011 | Mikami | H04N 1/40056 |
| | | | | 358/509 |
| 2011/0175883 | A1* | 7/2011 | Toyotaka | G09G 3/3648 |
| | | | | 345/211 |
| 2011/0175894 | A1* | 7/2011 | Wakimoto | G09G 3/3648 |
| | | | | 345/212 |
| 2012/0131475 | A1* | 5/2012 | Bhogal | G06Q 10/10 |
| | | | | 715/753 |
| 2013/0063646 | A1* | 3/2013 | Ueno | G03B 21/142 |
| | | | | 348/333.1 |
| 2013/0155275 | A1* | 6/2013 | Shimizu | H04N 5/2256 |
| | | | | 348/223.1 |
| 2013/0258134 | A1* | 10/2013 | Ashida | H04N 5/2357 |
| | | | | 348/223.1 |
| 2014/0139545 | A1* | 5/2014 | Tanikawa | G06T 7/0002 |
| | | | | 345/589 |
| 2014/0247961 | A1* | 9/2014 | Kim | H04N 21/8358 |
| | | | | 382/100 |
| 2014/0285498 | A1* | 9/2014 | Kim | G06F 1/1601 |
| | | | | 345/501 |
| 2015/0109535 | A1* | 4/2015 | Huang | H04N 21/4432 |
| | | | | 348/730 |
| 2015/0194100 | A1* | 7/2015 | Hada | G09G 3/025 |
| | | | | 345/690 |
| 2015/0220760 | A1* | 8/2015 | Foote | G06F 21/606 |
| | | | | 345/32 |
| 2015/0294627 | A1* | 10/2015 | Yoo | G06F 3/147 |
| | | | | 345/690 |
| 2016/0042201 | A1* | 2/2016 | Ninomiya | G06F 21/84 |
| | | | | 726/26 |
| 2016/0055306 | A1* | 2/2016 | Ozeki | G06Q 10/063114 |
| | | | | 705/2 |
| 2016/0142760 | A1* | 5/2016 | Son | H04N 21/47202 |
| | | | | 725/49 |
| 2017/0085948 | A1* | 3/2017 | Kang | H04N 21/4432 |

OTHER PUBLICATIONS

Office Action issued in parent U.S. Appl. No. 14/628,748 dated Jan. 26, 2017.

Office Action issued in parent U.S. Appl. No. 14/628,748 dated Sep. 27, 2017.

Notice of Allowance issued in parent U.S. Appl. No. 14/628,748 dated Jan. 2, 2018.

* cited by examiner

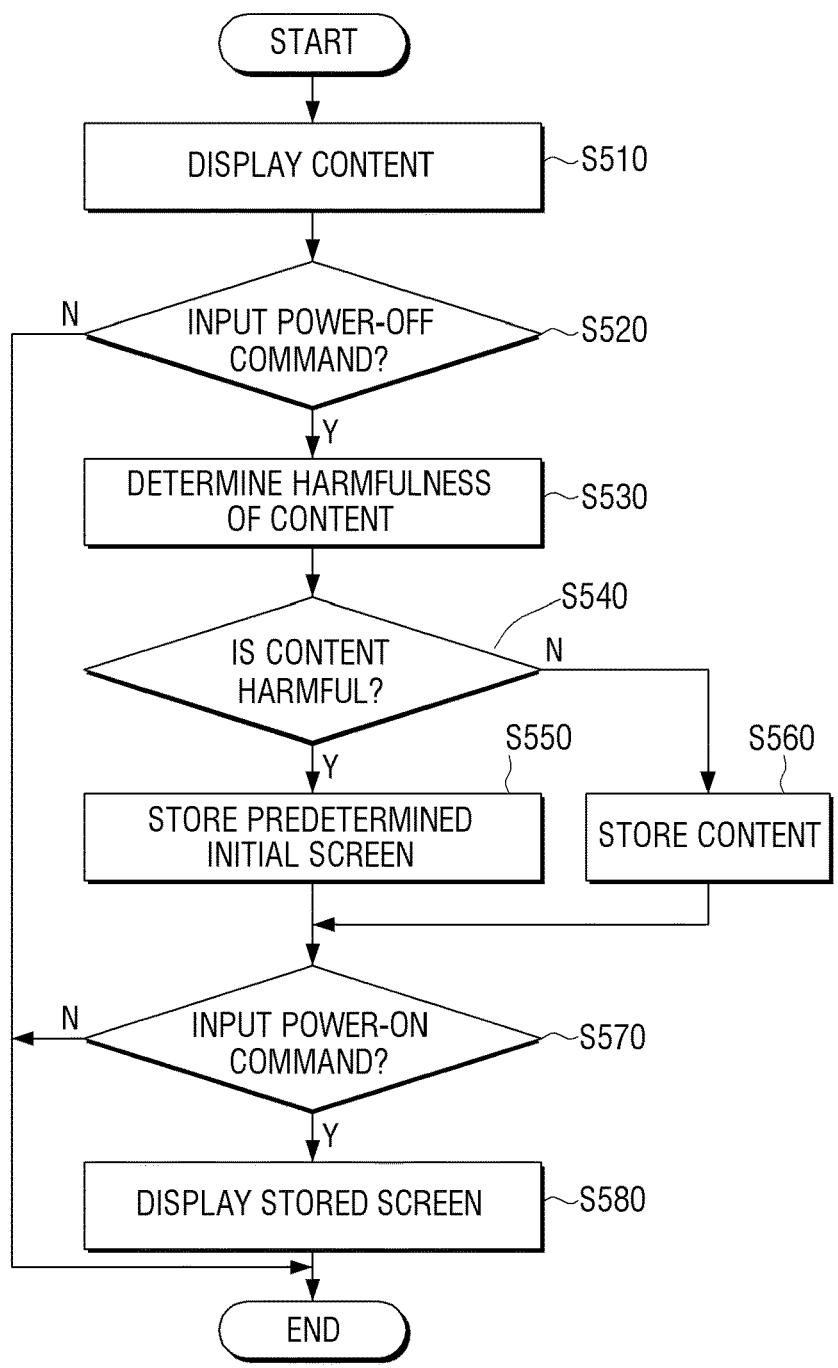

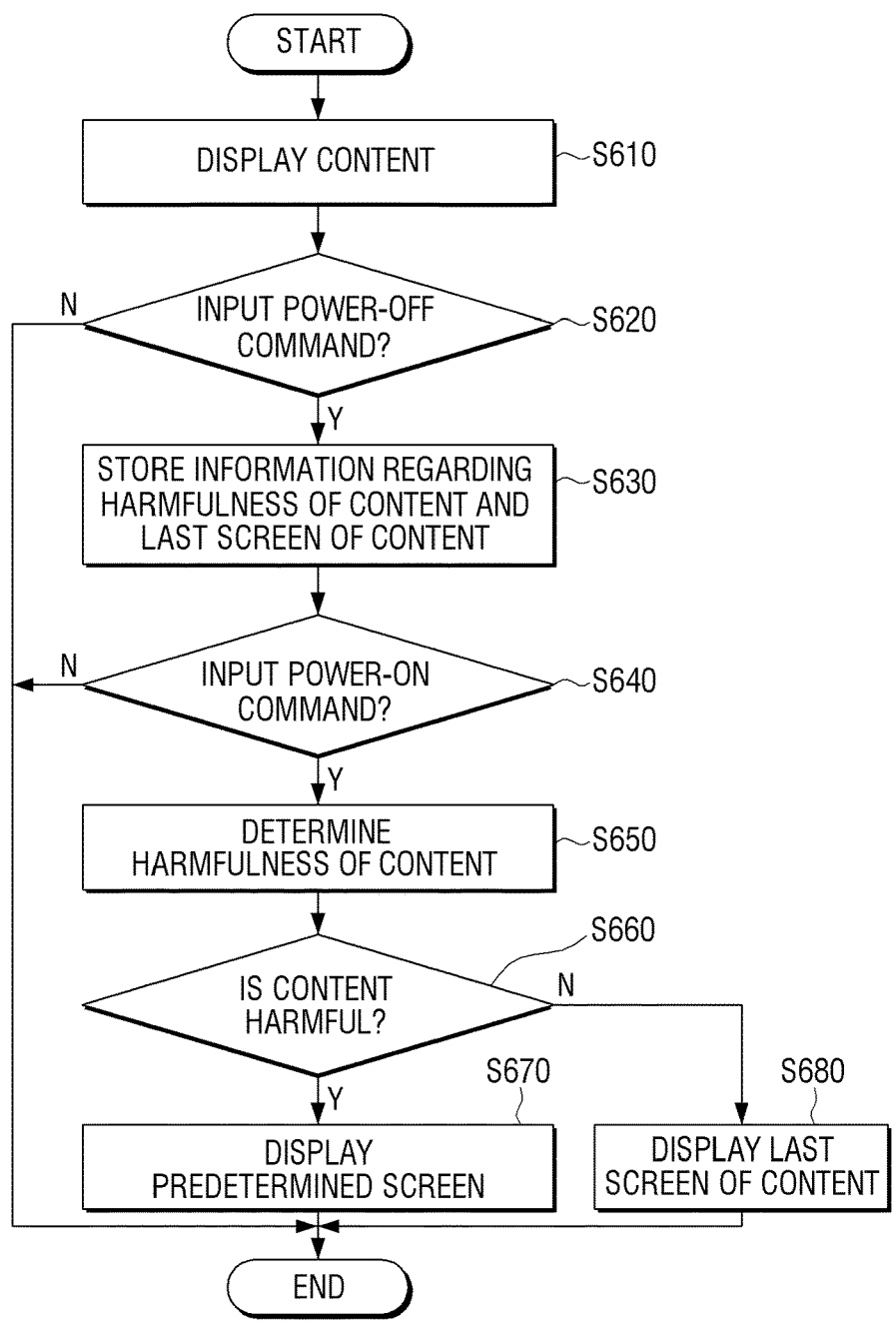

DISPLAY APPARATUS AND METHOD FOR CONTROLLING DISPLAY APPARATUS THEREOF

CROSS-REFERENCE TO RELATED APPLICATION

This is a continuation of U.S. application Ser. No. 14/628,748 filed on Feb. 23, 2015, which claims priority from Korean Patent Application No. 10-2014-0025964, filed in the Korean Intellectual Property Office on Mar. 5, 2014, the disclosure of which is incorporated herein by reference.

BACKGROUND

1. Field

Apparatuses and methods consistent with exemplary embodiments relate to a display apparatus and a controlling method thereof, and more particularly, to a display apparatus which determines a screen to be displayed when a power-on command is input in consideration of appropriateness of contents which had been displayed before a power-off command was input.

2. Description of the Related Art

A recently developed display apparatus stores a content screen which has been displayed before a power-off command is input, and when a power-on command is input, displays the stored content screen again.

Meanwhile, a personal terminal such as a smart phone goes through an authentication process through a lock screen to prevent an intended image from being displayed even though the image had been displayed before a power-off command was input.

However, unlike a personal terminal, a display apparatus such as a television which is generally used by family members may have the problem of displaying a content which should not be viewed by some of the family members (for example, adult entertainment content) as it displays a content screen which had been displayed before the television was turned off by a power-off command being input.

SUMMARY

An aspect of the exemplary embodiments relates to a display apparatus which may determine harmfulness or appropriateness of a content which had been displayed before a power-off command was input and determine a screen to be displayed based on the determination regarding the harmfulness or appropriateness of the content when a power-on command is input.

A method of controlling a display apparatus according to an exemplary embodiment includes, in response to a power-off command being input while a content is displayed, determining whether or not the displayed content is appropriate to be subsequently displayed when a power-on command is input; in response to determining that the displayed content is not appropriate to be subsequently displayed when the power-on command is input, storing a predetermined initial screen, and in response to determining that the displayed content is appropriate to be displayed when a power-on command is input, storing the displayed content; and in response to a power-on command being input, displaying one from among the predetermined initial screen and the displayed content.

The determining may include analyzing a screen color of the displayed content and determining whether or not the displayed content is appropriate to be subsequently displayed when a power-on command is input by determining whether a ratio of a predetermined color on a content screen exceeds a predetermined value.

The determining may include determining whether or not the displayed content is appropriate to be subsequently displayed when a power-on command is input by determining whether a mark for viewing restriction is displayed on an area of a content screen.

The determining may include determining whether or not the displayed content is appropriate to be subsequently displayed when a power-on command is input determining harmfulness of the displayed content using at least one from among uniform resource locator (URL) information related to the displayed content, a file name related to the displayed content, electronic program guide (EPG) information related to the displayed content, and subtitle information related to the displayed content.

The storing may include, in response to the determining that the displayed content is not appropriate to be subsequently displayed when the power-on command is input, storing a predetermined initial screen in a memory, and in response to determining that the displayed content is appropriate to be displayed when a power-on command is input, storing a last screen of the displayed content in the memory.

The memory is a volatile memory that is continuously supplied with power.

A display apparatus according to an exemplary embodiment includes a display configured to display a content; an input unit configured to receive a command; and a controller configured to, in response to a power-off command being input while a content is displayed, determine whether or not the displayed content is appropriate to be subsequently displayed when a power-on command is input; in response to determining that the displayed content is not appropriate to be subsequently displayed when the power-on command is input, store a predetermined initial screen; in response to determining that the displayed content is appropriate to be subsequently displayed when a power-on command is input, store the displayed content; and in response to a power-on command being input, control the display to display one of the predetermined initial screen and the displayed content.

The controller may analyze a screen color of the displayed content and determines whether or not the displayed content is appropriate to be subsequently displayed when a power-on command is input by determining whether a ratio of a predetermined color on a content screen exceeds a predetermined value.

The controller determines whether or not the displayed content is appropriate to be subsequently displayed when a power-on command is input by determining whether a mark for viewing restriction is displayed on an area of a content screen.

The controller determines whether or not the displayed content is appropriate to be subsequently displayed when a power-on command is input using at least one from among uniform resource locator (URL) information of the displayed content, a file name of the displayed content, electronic program guide (EPG) information of the displayed content, and subtitle information of the displayed content.

The display apparatus may further include a storage which may include a memory, and the controller, in response to determining that the displayed content is not appropriate to be subsequently displayed when the power-on command is input, stores a predetermined initial screen in the memory, and in response to determining that the displayed content is appropriate to be subsequently displayed when the power-on command is input, stores a last screen of the displayed content in the memory.

The memory may be a volatile memory that is continuously supplied with power.

A method of controlling a display apparatus according to an exemplary embodiment includes, in response to a power-off command being input while a content is displayed, storing information related to whether or not the displayed content is appropriate to be subsequently displayed when a power-on command is input and a last screen of the content; in response to a power-on being input, determining whether or not the displayed content is appropriate to be displayed using the information related to whether or not the displayed content is appropriate to be subsequently displayed when a power-on command is input; and in response to determining that the displayed content is not appropriate, displaying a predetermined initial screen, and in response to determining the displayed content is not appropriate, displaying the stored last screen of the content.

The information related to whether or not the displayed content is appropriate to be subsequently displayed when a power-on command is input may include at least one from among screen information of the content, uniform resource locator (URL) information of the content, a file name of the content, and electronic program guide (EPG) information of the displayed content.

A display apparatus according to an exemplary embodiment includes a display configured to display a content; an input unit configured to receive a user command; a storage; and a controller configured to, in response to a power-off command being input through the input unit while the content is displayed, store information related to whether or not the displayed content is appropriate to be subsequently displayed when a power-on command is input and a last screen of the content in the storage; in response to a power-on command being input through the input unit, determine whether or not the content is appropriate to be displayed using the information related to whether or not the displayed content is appropriate to be subsequently displayed when a power-on command is input in response to determining that the displayed content is not appropriate to be displayed, control the display to display a predetermined initial screen, and in response to determining that the displayed content is appropriate to be displayed, control the display to display the stored last screen of the content.

The information related to whether or not the displayed content is appropriate to be subsequently displayed when a power-on command is input includes at least one from among screen information of the content, uniform resource locator (URL) information of the displayed content, a file name of the displayed content, and electronic program guide (EPG) information of the displayed content.

According to the above-described various exemplary embodiments, displaying inappropriate or harmful content that some family members should not watch, which was displayed when a power-off command was input, when a power-on command is input, can be prevented.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 5 is a flowchart provided to explain a method for controlling a display apparatus according to an exemplary embodiment; and FIG. 6 is a flowchart provided to explain a method for controlling a display apparatus according to another exemplary embodiment.

DETAILED DESCRIPTION

Figure 1:
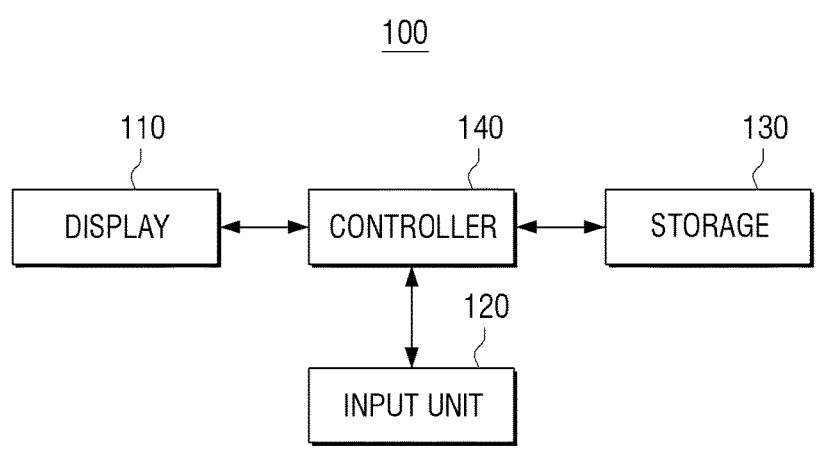
FIG. 1 is a block diagram illustrating configuration of a display apparatus briefly according to an exemplary embodiment.

Hereinafter, exemplary embodiments will be described in detail with reference to accompanying drawings. In the following description, same reference numerals are used for analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

In the present disclosure, relational terms such as first and second, and the like, may be used to distinguish one entity from another entity, without necessarily implying any actual relationship or order between such entities.

FIG. 1 is a block diagram illustrating a configuration of a display apparatus 100 according to an exemplary embodiment. As illustrated in FIG. 1, the display apparatus 100 includes a display 110, an input unit 120 (e.g., inputter), a storage 130, and a controller 140. In this case, the display apparatus 100 may be realized as a smart television, but this is only an example. The display apparatus 100 may be realized as various display apparatuses such as a projection television, a desktop PC, a notebook PC, etc.

The display 110 displays an image content which is input from various sources under the control of the controller 140. In particular, if a power-on command is input, the display 110 may display a predetermined initial screen or the last screen of the content which had been displayed before a power-off command was input based on the harmfulness of the content which had been displayed before the power-off command was input. Additionally, although harmfulness of the content which had been displayed before the power-off command is input, is mentioned throughout this specification as an exemplary factor in determining whether a predetermined initial screen or the last screen of the content is displayed, an alternative factor may be the 'appropriateness' of the content which had been displayed before the power-off command is input.

The input unit 120 receives various user commands to control the display apparatus 100. In particular, the input unit 120 may receive a user command to turn on/off the display apparatus 100.

The storage 130 stores various programs and data to drive the display apparatus 100. In particular, the storage 130 may store the last screen of the content which had been displayed before a power-off command was input or a predetermined screen. In another exemplary embodiment, the storage 130 may store information regarding harmfulness of contents and the last screen of contents. In this case, the storage 130 may be realized as a volatile memory such as Random Access Memory (RAM), and power may be applied all the time.

The controller 140 controls overall functions of the display apparatus 100 according to a user command input through the input unit 120. In particular, if a power-off command is input through the input unit 120 while a content is displayed, the controller 140 may determine harmfulness of the content. If it is determined that the displayed content is harmful, a predetermined initial screen is stored in the storage, and if it is determined that the displayed content is not harmful, the displayed content may be stored in the storage 130. Subsequently, if a power-on command is input through the input unit 120, the controller 140 may control the display 110 to display one of the predetermined initial screen and the displayed content.

Specifically, if a power-off command is input through the input unit 120 while a content is displayed, the controller 140 may determine whether the content is harmful or not using various methods. For example, the controller 140 may determine harmfulness of the displayed content by analyzing the color of the content screen and determining whether the portion of the content screen in a predetermined color (for example, the skin color of human) exceeds a predetermined value. In another example, the controller 140 may determine harmfulness of the displayed content by analyzing the content screen and determining whether there is a viewing restriction mark (for example, a viewing restriction mark for those under 19). In another example, the controller 140 may determine harmfulness of the displayed content using at least one of URL information, a file name, and EPG information of the content.

If the controller 140 determines that the displayed content is harmful, a predetermined initial screen may be stored in a volatile memory of the storage 130, and if the controller 140 determines that the displayed content is not harmful, the last screen of the displayed content may be stored in a volatile memory of the storage 130.

Meanwhile, according to an exemplary embodiment, even if a power-off command is input, the display apparatus 100 may maintain a Suspend to RAM status where power is continuously applied to the volatile memory all the time.

If a power-on command is input while the display apparatus 100 maintains the Suspend to RAM status, the controller 140 may control the display 110 to display one of the predetermined initial screen and the last screen of the content which are stored in the volatile memory. That is, if it is determined that the content which had been displayed when the power-off command was input is harmful, the controller 140 may control the display 110 to display the predetermined initial screen stored in the volatile memory, and if it is determined that the content which had been displayed when the power-off command was input is not harmful, the controller 140 may control the display 110 to display the last screen of the content stored in the volatile memory (that is, the screen of the content which was displayed at the time when the power-off command was input).

Meanwhile, in the above exemplary embodiment, the controller 140 determines whether a content is harmful before a power-on command is input, but this is only an example. The controller 140 may determine whether the content is harmful after a power-on command is input.

Specifically, if a power-off command is input through the input unit 120 while a content is displayed, the controller 140 stores information regarding harmfulness of the content and the last screen of the content in the storage 130. Subsequently, if a power-on command is input through the input unit 130, the controller 140 may determine whether the content is harmful using the information regarding harmfulness of the content. In this case, the information regarding harmfulness of the content may include at least one of the last screen, a file name, a URL, and EPG information of the content.

If it is determined that the content which had been displayed when the power-off command was input is harmful, the controller 140 may control the display 110 to display the predetermined initial screen, and if it is determined that the content which had been displayed when the power-off command was input is not harmful, the controller 140 may control the display 110 to display the last screen of the content stored in the storage 130.

According to another exemplary embodiment, if a content displayed when a power-off command is input is harmful, the controller 140 may store information that the displayed content is harmful and user information in the storage 130 along with the content which is currently displayed. If a power-on command is input, the controller 140 may determine whether to display the content displayed when the power-off command is input continuously based on the information that the content is harmful and user information which is stored in the storage 130. If it is determined that the content is not to be displayed, the controller 140 may control the display 110 to display a specific initial screen.

For example, if the content displayed when an apparatus is turned off is adult content and a user is A while a user is B when the apparatus is turned on, the controller 140 may determine the adult content not to be displayed, and control the display 110 to display a specific initial screen. In this case, the specific initial screen may be a screen which is displayed when a power-on command is input after cold-booting.

As described above, according to the display apparatus 100 which provides the Suspend to RAM function, displaying a harmful content which should not be viewed by some viewers when a power-on command is input can be prevented.

Figure 2:
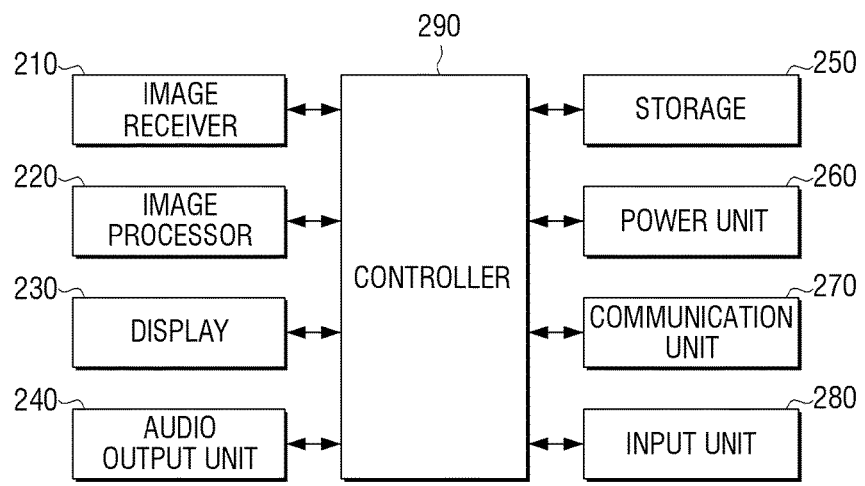
FIG. 2 is a block diagram illustrating configuration of a display apparatus in detail according to an exemplary embodiment.

Hereinafter, the display apparatus 200 will be described in detail with reference to FIGS. 2 to 4B. FIG. 2 is a block diagram illustrating configuration of the display apparatus 200 in detail according to an exemplary embodiment. As illustrated in FIG. 2, the display apparatus 200 includes an image receiver 210, an image processor 220, a display 230, an audio output unit 240, a storage 250, a power unit 260, a communication unit 270, an input unit 280, and a controller 290.

The image receiver 210 receives image data through various sources. For example, the image receiver 210 may receive broadcast data from an external broadcasting station, receive image data from an external apparatus (for example, a digital versatile disc (DVD) device), and stream image data from an external server.

The image processor 220 performs image processing with respect to image data received from the image receiver 210. The image processor 220 may perform various image processing with respect to image data, such as decoding, scaling, noise filtering, frame rate conversion, resolution conversion, etc.

The display 230 displays at least one of an image frame which is generated as the video processor 220 processes image data received from the image receiver 210 and various objects generated from a graphic processor (not shown). In particular, if a power-on command is input, the display 230 may display a predetermined initial screen or the last screen of the content which had been displayed before a power-off command was input depending on whether the content is harmful or not.

The audio output unit 240 outputs not only various audio data processed by an audio processing module but also various alarm sounds or voice messages.

The storage 250 stores various modules to drive the display apparatus 200. For example, the storage 250 may store various software including a base module, a sensing module, a communication module, a presentation module, a web browser module, and a service module. In this case, the base module refers to a basic module which processes a signal transmitted from each hardware included in the display apparatus 100/200, and transmits the processed signal to an upper layer module. The sensing module is a module which collects information from various sensors, and analyzes and manages the collected information. The sensing module may include a face recognition module, a voice recognition module, a motion recognition module, and an NFC recognition module, and so on. The presentation module is a module to compose a display screen. The presentation module includes a multimedia module for reproducing and outputting multimedia contents, and a UI rendering module for UI and graphic processing. The communication module is a module to perform communication with outside. The web browser module refers to a module which accesses a web server by performing web-browsing. The service module is a module including various applications for providing various services.

As described above, the storage 250 may include various program modules, but some of the various program modules may be omitted, changed, or added according to the type and characteristics of the display apparatus 200. For example, in response to the display apparatus 200 being realized as a tablet PC, the base module may further include a determination module to determine a GPS-based location, and the sensing module may further include a sensing module to sense the operation of a user.

In addition, when a power-off command is input, the storage 250 may store a predetermined initial screen or the last screen of a displayed content depending on whether the displayed content is harmful or not. In this case, the storage 250 may be realized as a non-volatile memory such as RAM, but this is only an example. The storage 250 may be realized as another memory device. In addition, even when a power-off command is input, the display apparatus 200 may maintain a Suspend to RAM status where power is continuously applied to a non-volatile memory (e.g., all the time).

The power unit 260 applies power to the configuration of the display apparatus 200. In particular, the power unit 260 may apply power to the non-volatile memory of the storage 250 all the time even if a power-off command is input through the input unit 280.

The communication unit 270 communicates with various types of external apparatuses according to various types of communication methods. The communication unit 270 may include various communication chips such as a WiFi chip, a Bluetooth chip, a Near Field Communication (NFC) chip, a wireless communication chip, and so on. In this case, the WiFi chip, the Bluetooth chip, and the NFC chip perform communication according to a WiFi method, a Bluetooth method, and an NFC method, respectively. Among the above chips, the NFC chip represents a chip which operates according to an NFC method which uses 13.56 MHz band among various RF-ID frequency bands such as 135 kHz, 13.56 MHz, 433 MHz, 860-960 MHz, 2.45 GHz, and so on. In the case of the WiFi chip or the Bluetooth chip, various connection information such as SSID and a session key may be transmitted/received first for communication connection and then, various information may be transmitted/received. The wireless communication chip represents a chip which performs communication according to various communication standards such as IEEE, Zigbee, 3rd Generation (3G), 3rd Generation Partnership Project (3GPP), Long Term Evolution (LTE) and so on.

The input unit 280 receives various user commands to control the display apparatus 200. In particular, the input unit 280 may receive a power-off command and a power-on command to turn on/off the power of the display apparatus 200. In this case, if the input unit 280 is realized as a remote controller, the power-off command and the power-on command may be a user command to select a power button on the remote controller.

Meanwhile, in the above exemplary embodiment, the input unit 280 may be realized as a remote controller, but this is only an example. The input unit 280 may be realized as various other input devices such as a touch point, a pointing device motion recognition apparatus, a voice recognition apparatus, keyboard, mouse, and so on.

The controller 290 controls the overall operations of the display apparatus 200 according to a user command which is input through the input unit 280. In particular, the controller 290 may determine a screen to be displayed depending on whether the content which had been displayed before a power-on command is input is harmful or not.

Figure 3A:
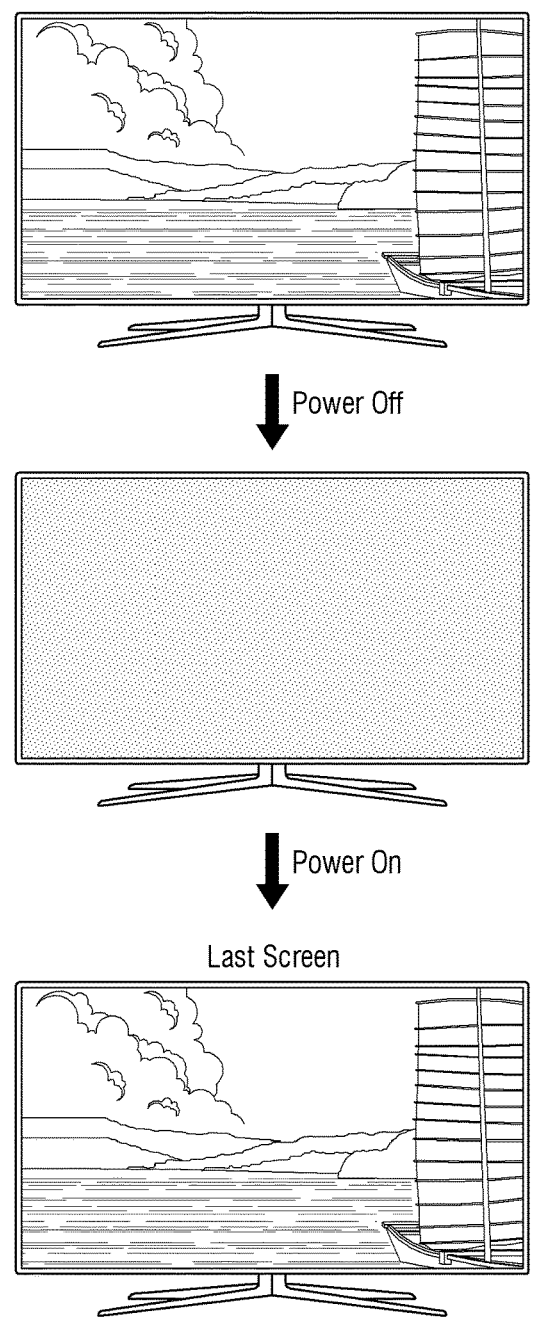
FIGS. 3A and 3B are views provided to explain a function of providing a last screen according to a conventional art.
Figure 3B:
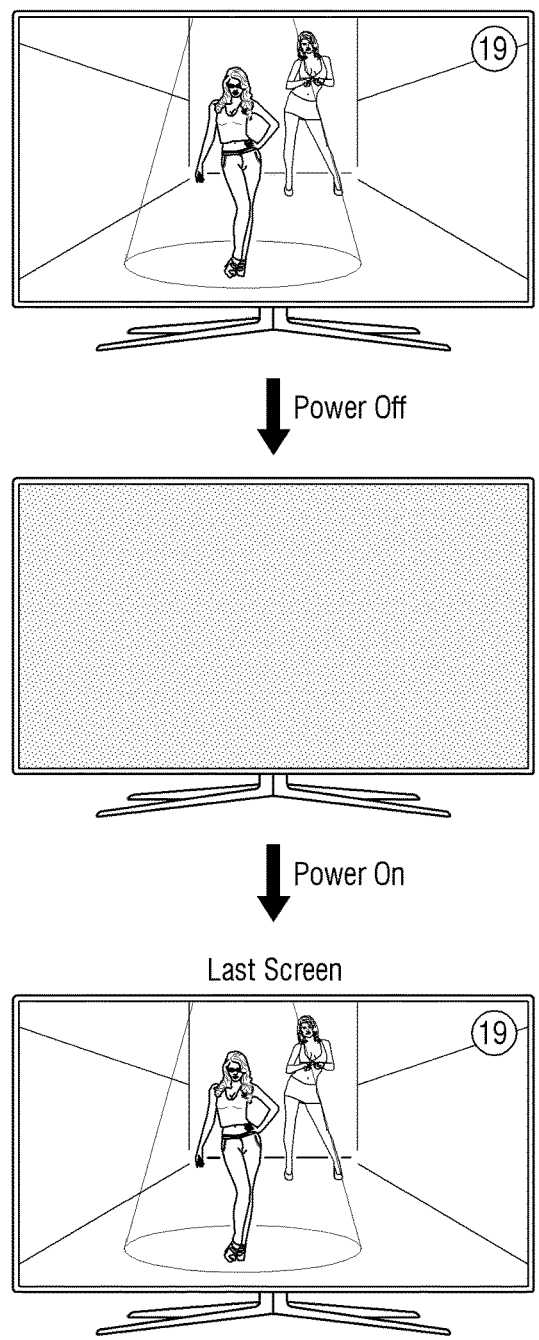

Specifically, in the conventional art, if a power-off command is input while a general content illustrated in FIG. 3B is displayed and a power-on command is input again, a display apparatus displays the last screen of the general content which was displayed previously. If a power-off command is input while a harmful content such as a content for adults illustrated in FIG. 3B is displayed and a power-on command is input again, the display apparatus displays the last screen of the harmful content which was displayed previously. That is, in the conventional art, regardless of whether a content is harmful or not, the last screen of the content which was displayed previously when a power-on command is input. Accordingly, some of family members using the display apparatus may end up viewing the harmful content which is inappropriate for them.

However, according to an exemplary embodiment, if a power-off command is input through the input unit 280 while a content is displayed, the controller 290 may determine the harmfulness of the displayed content. In this case, the controller 290 may determine the harmfulness of the displayed content using various methods.

For example, the controller 290 may determine the harmfulness of the displayed content by analyzing the color of the content screen at the time when a power-off command is input and determining whether a ratio of a predetermined color on the content screen exceeds a predetermined value. Specifically, the controller 290 may measure and digitize the degree of skin color of each pixel using the color value of each pixel of the content screen at a time when a power-off command is input, generate an integral image based on the information where the degree of skin color of each pixel is digitized, and determine whether a specific area is an area of skin color or not. Subsequently, the controller 290 may determine that the content is harmful if ratio of the area of skin color on the display screen exceeds a predetermined value.

In another example, the controller 290 may determine the harmfulness of the displayed content by analyzing a content screen at a time when a power-off command is input and determining whether a viewing restriction mark is displayed on an area of the content screen. Specifically, the controller 290 may analyze the content screen at a time when a power-off command is input, and if it is determined that a mark indicating viewing restriction for those under the age of 19 (for example, a UI where 19 is displayed inside a circle) is displayed on an area of the content screen, the controller 190 may determine that the content is harmful. Meanwhile, in the above exemplary embodiment, a mark indicating viewing restriction for those under the age of 19 is described, but this is only an example. A mark indicating viewing restriction for those in another age group (for example, a mark indicating viewing restriction for those under the age of 15) may also be included in the technical concept of an exemplary embodiment.

As described above, by analyzing a content screen at a time when a power-off command is input and thus, determining the harmfulness of a content, the display apparatus 200 may determine the harmfulness of a content which is displayed currently without any other external information.

In another example, the controller 290 may determine the harmfulness of the displayed content using at least one of URL information, a file name, EPG information, and subtitle information of the content. That is, if it is determined that the URL information of the content is a web site for adults, the file name of the content is the file name of adult content, the EPG information indicates that the content is not supposed to be viewed by those under the age of 19, or the subtitle information of the content includes obscene and swear words, the controller 290 may determine that the content is harmful.

If it is determined that the displayed content is harmful according to the above-described determination methods, the controller 290 may store a predetermined initial screen in a volatile memory of the storage 250, and if it is determined that the displayed content is not harmful, the controller 290 may store the last screen of the displayed screen in a volatile memory of the storage 250. In addition, the controller 290 may control the power unit 260 not to apply power to the display 230. Meanwhile, the controller 290 may store the last screen of the content, but this is only an example. The controller 290 may store information regarding the last screen of the content (for example, information regarding the play time of the last screen).

In this case, power may be applied to the volatile memory where the predetermined initial screen or the last screen of the content is stored all the time. That is, the display apparatus 200 may maintain a Suspend to RAM status.

Figure 4A:
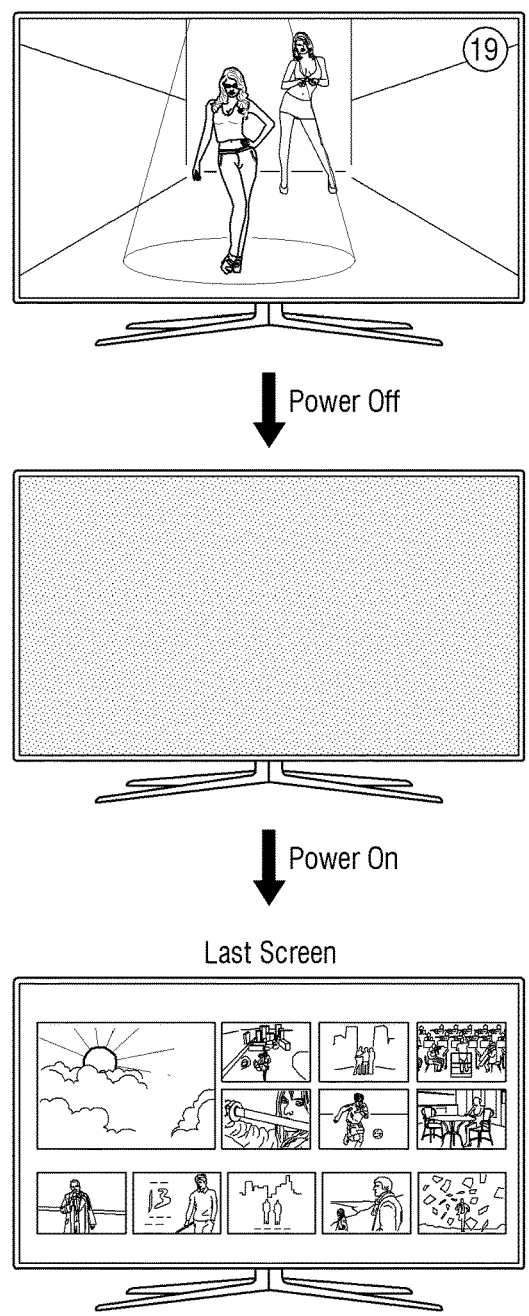
FIGS. 4A and 4B are views provided to explain a function of providing a last screen according to an exemplary embodiment.
Figure 4B:
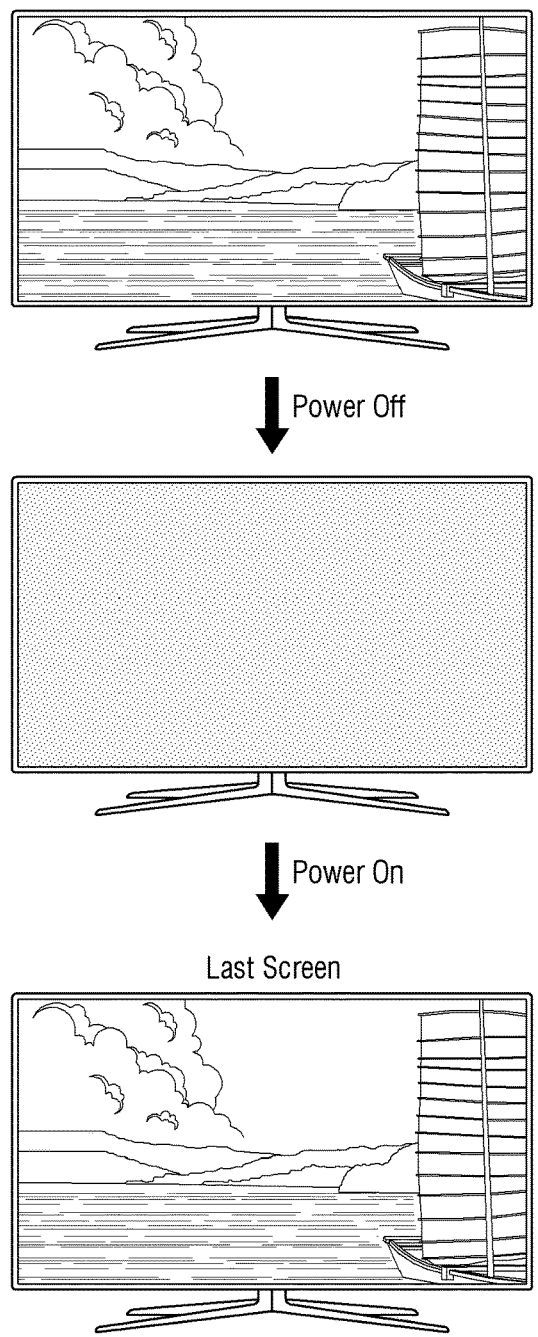

If a power-on command is input through the input unit 280 while the display apparatus 200 maintains the Suspend to RAM status, the controller 290 may control the display 230 to display the predetermined initial screen or the last screen of the content which are stored in the volatile memory. That is, as illustrated at the top of FIG. 4A, if a power-off command is input while an adult content is displayed, the controller 290 may determine that the content which was displayed at a time when the power-off command was input is harmful, store a predetermined initial screen in the storage 250, and control the power unit 260 to cut off power to the display 230 as illustrated at the center of FIG. 4A. Subsequently, if a power-on command is input through the input unit 280, the controller 290 may control the display 230 to display the initial screen stored in the volatile memory of the storage 250 as illustrated at the bottom of FIG. 4A. However, as illustrated at the top of FIG. 4B, if a power-off command is input while a general content is displayed, the controller 290 may determine that the content which as displayed when a power-off command was input is not harmful, store the content in the volatile memory of the storage 250, and control the power unit 260 to cut off power to the display 230 as illustrated at the center of FIG. 4B. Subsequently, if a power-on command is input through the input unit 280, the controller 290 may control the display 230 to display the last screen of the content stored in the volatile memory of the storage 250 as illustrated at the bottom of FIG. 4B.

Meanwhile, in the above-exemplary embodiment, a predetermined initial screen or the last screen of a content is stored when a power-off command is input, but this is only an example. Instead, information regarding harmfulness of contents may be stored. For example, if it is determined that a content displayed when a power-off command is input is harmful, the controller 290 may store information that the content is harmful in the volatile memory of the storage 250, and if it is determined that a displayed content is not harmful, the controller 290 may store information that the content is not harmful in the volatile memory of the storage 250.

Meanwhile, in the above exemplary embodiment, an adult image content is described as a harmful content, but this is only an example. The technical concept of an exemplary embodiment may be applied to various adult contents such as an adult web site, an adult game content, an adult social content, etc.

Meanwhile, in the above exemplary embodiment, whether or not a content is harmful is determined before a power-on command is input, but this is only an example. The controller 290 may determine whether or not a content is harmful after a power-on command is input. Specifically, if a power-off command is input through the input unit 280 while a content is displayed, the controller 290 may store information regarding harmfulness of a content and the last screen of a content in the volatile memory of the storage 250. In this case, the information regarding harmfulness of a content refers to information to determine whether the content is harmful or not, and may be screen information, URL information, file name information, EPG information, subtitle information of the content, etc. at a time when a power-off command is input.

In this case, the display apparatus 200 may maintain a Suspend on RAM status where power is supplied to the volatile memory of the storage 250 even if a power-off command is input.

In addition, if a power-on command is input through the input unit 280, the controller 290 may determine whether a content is harmful as described above using information regarding harmfulness of the content. Specifically, the controller 290 may determine harmfulness of a content by analyzing the color of the last screen of the content and determining whether a ratio of a predetermined color (for example, skin color) in the content screen exceeds a predetermined value. In addition, the controller 290 may determine harmfulness of a displayed content by analyzing the last screen of the content and determining whether a viewing restriction mark is displayed on an area of the content screen. Further, the controller 290 may determine harmfulness of a displayed content using at least one of URL information, a file name, EPG information, and subtitle information of the content.

If it is determined that the displayed content is harmful, the controller 290 may control the display 230 to display a predetermined initial screen, and if it is determined that the displayed content is not harmful, the controller 290 may control the display 230 to display the last screen of the content stored in the volatile memory.

As described above, different display screens may be stored in a volatile memory depending on whether a content is harmful or not in a display apparatus which supports a Suspend to RAM status where power is applied to the volatile memory all the time even if a power-off command is input and thus, a user may prevent a harmful content from being played in an unwanted circumstance.

Hereinafter, a method of controlling a display apparatus according to various exemplary embodiments will be described with reference to FIGS. 5 and 6.

First, FIG. 5 is a flowchart provided to explain an exemplary embodiment where harmfulness of a content is determined before a power-on command is input according to an exemplary embodiment.

First, the display apparatus 100 displays a content (S510).

While the content is displayed, the display apparatus 100 determines whether a power-off command is input (S520).

If a power-off command is input (S520-Y), the display apparatus 100 determines harmfulness of the content (S530). In this case, the display apparatus 100 may determine harmfulness of the content by analyzing the content screen at a time when the power-off command is input or by using at least one of URL information, a file name, EPG information, and subtitle information of the content.

If it is determined that the content is harmful (S540-Y), the display apparatus 100 stores a predetermined initial screen (S550). However, if it is determined that the content is not harmful (S540-N), the display apparatus 100 stores the content (S560). In particular, if it is determined that the content is not harmful, the display apparatus 100 may store the last screen of the content when the power-off command is input.

Subsequently, the display apparatus 100 determines whether a power-on command is input (S570).

If a power-on command is input (S570-Y), the display apparatus 100 displays the stored screen (S580). That is, if the content displayed when the power-off command is input is a harmful content, the display apparatus 100 may display the predetermined initial screen, and if the content displayed when the power-off command is input is not a harmful content, the display apparatus 100 may display the last screen of the content which was displayed when the power-off command was input.

FIG. 6 is a flowchart provided to explain an exemplary embodiment where harmfulness of a content is determined after a power-on command is input according to another exemplary embodiment.

First, the display apparatus 100 displays a content (S610).

While the content is displayed, the display apparatus 100 determines whether a power-off command is input (S620).

If a power-off command is input (S620-Y), the display apparatus 100 stores information regarding harmfulness of the content and the last screen of the content (S630). In this case, the information regarding harmfulness of the content may include at least one of screen information, URL information, a file name, EPG information, and subtitle information of the content at a time when the power-off command is input.

Subsequently, the display apparatus 100 determines whether a power-on command is input (S640).

If a power-on command is input (S640-Y), the display apparatus 100 determines harmfulness of the content (S650). Specifically, the display apparatus 100 may determine harmfulness of the content using information regarding harmfulness of the content as described above with reference to FIG. 2.

If it is determined that the content is harmful (S660-Y), the display apparatus 100 displays a predetermined initial screen (S670). However, if it is determined that the content is not harmful (S660-N), the display apparatus 100 displays the content displayed last when the power-off command was input (S680).

As described above, if there is harmfulness in the content displayed when a power-off command is input, an initial screen is provided to a user when a power-on command is input next. Accordingly, displaying a harmful content which should not be watched by some of the family members can be prevented.

Meanwhile, the method of controlling a display apparatus according to the above-described various exemplary embodiments may be realized as a program and provided to a display apparatus or an input apparatus. In particular, the program including the method of controlling a display apparatus may be stored in a non-transitory computer readable medium and provided therein.

The non-transitory recordable medium refers to a medium which may store data semi-permanently rather than storing data for a short time such as a register, a cache, and a memory and may be readable by an apparatus. Specifically, the above-described various applications or programs may be stored in the non-transitory readable medium may be compact disk (CD), DVD, hard disk, Blu-ray disk, universal serial bus (USB), memory card, read-only memory (ROM), etc. and provided therein.

What is claimed is:

1. A method of controlling a display apparatus, comprising:
    displaying a content image;
    in response to a power-off command being received while the content image is displayed, determining whether to subsequently display the content image by analyzing a ratio of an area corresponding to a predetermined color in the content image;
    determining to subsequently display the content image when the ratio of an area corresponding to the predetermined color in the content image does not exceed a predetermined value;
    determining not to subsequently display the content image when the ratio of the area corresponding to the predetermined color in the content image exceeds the predetermined value;
    in response to determining to subsequently display the content image, storing display information related to the content image; and
    in response to the power-on command being received, displaying a screen corresponding to the content image based on the stored display information or a predetermined initial screen.

2. The method as claimed in claim 1, further comprising determining whether to subsequently display the content image when a power-on command is received based on whether the content image includes a mark for viewing restriction.

3. The method as claimed in claim 1, further comprising determining whether to subsequently display the content image when a power-on command is received based on at least one from among uniform resource locator (URL) information related to the content image, a file name related to the content image, electronic program guide (EPG) information related to the content image, and subtitle information related to the content image.

4. The method as claimed in claim 1, wherein the display information related to the content image comprises information related to the content image displayed at a time when the power-off command is received.

5. The method as claimed in claim 1, wherein the storing display information comprises storing the display information in a volatile memory that is continuously supplied with power.

6. A display apparatus, comprising:
a memory;
a display; and
a processor configured to:
 control the display to display a content image;
 in response to a power-off command being received while the content image is displayed, determine whether to subsequently display the content image by analyzing a ratio of an area corresponding to a predetermined color in the content image;
 determine to subsequently display the content image when the ratio of an area corresponding to the predetermined color in the content image does not exceed a predetermined value;
 determine to subsequently display the content image when the ratio of the area corresponding to the predetermined color in the content image exceeds the predetermined value;
 in response to determining to subsequently display the content image, store display information related to the content image in the memory; and
 in response to the power-on command being received, control the display to display a screen corresponding to the content image based on the stored display information or a predetermined initial screen.

7. The display apparatus as claimed in claim 6, wherein the processor determines whether to subsequently display the content image when a power-on command is received based on whether the content image includes a mark for viewing restriction.

8. The display apparatus as claimed in claim 6, wherein the processor determines whether to subsequently display the content image when a power-on command is received based on at least one from among uniform resource locator (URL) information of the content image, a file name of the content image, electronic program guide (EPG) information of the content image, and subtitle information of the content image.

9. The display apparatus as claimed in claim 6, wherein the display information related to the content image comprises information related to the content image displayed at a time when the power-off command is received.

10. The display apparatus as claimed in claim 6, wherein the memory is a volatile memory that is continuously supplied with power.

* * * * *